Aug. 26, 1958     L. L. TOUTON     2,849,105
CONVEYER APPARATUS
Filed March 21, 1956
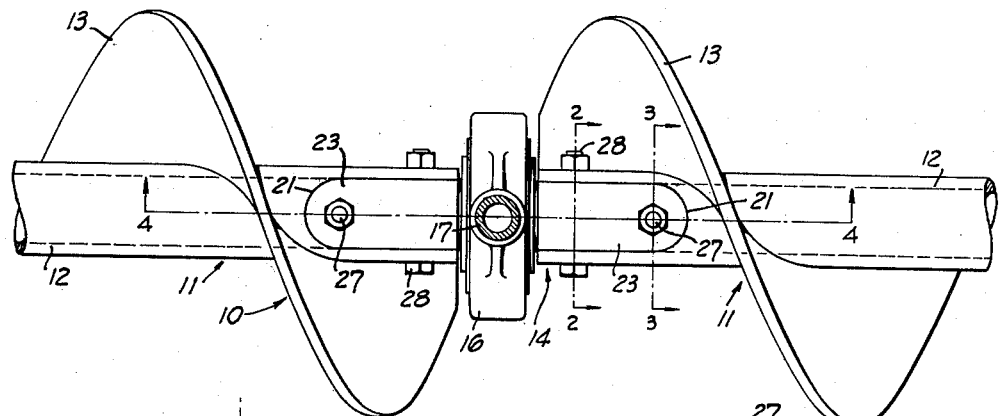
FIG_1_
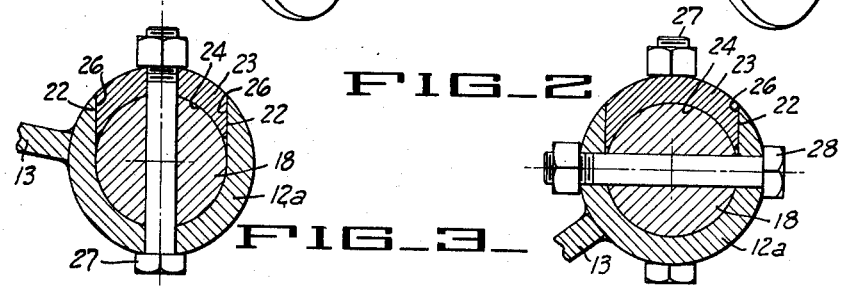
FIG_2_    FIG_3_
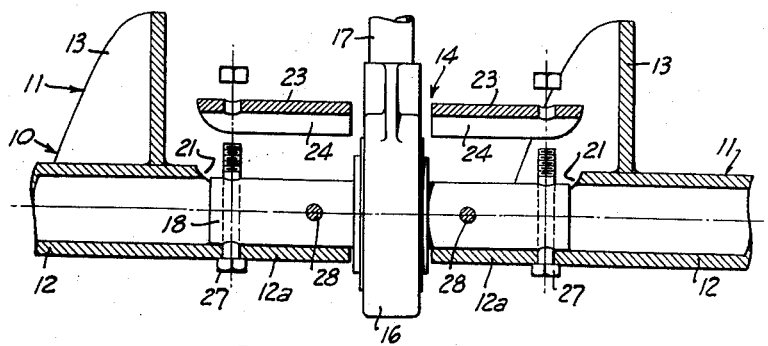
FIG_4_ FIG_6_
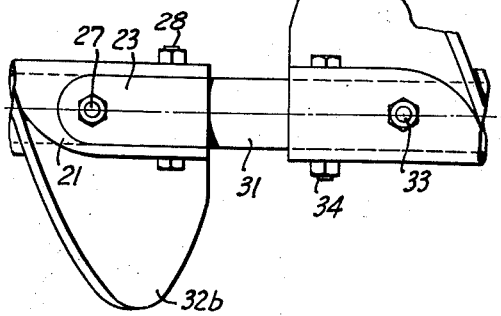
FIG_5_
INVENTOR.
Louis L. Touton
BY
ATTORNEYS

United States Patent Office 2,849,105
Patented Aug. 26, 1958

2,849,105

CONVEYER APPARATUS

Louis L. Touton, Fresno, Calif.

Application March 21, 1956, Serial No. 572,969

3 Claims. (Cl. 198—213)

This invention relates generally to conveying apparatus of the rotary screw type.

In the handling of various materials it is common to provide a rotary screw in the form of a plurality of sections that are coupled together to form a screw of the desired length. The screw is positioned within a trough or housing whereby the flights operate upon the material to move it to a point of discharge. It is desirable to support the screw by bearings located between the sections, with such bearings being carried by suitable support means, such as brackets that do not interfere with the movement of the material being conveyed. In the past it has been common to use bearings of the split type (as distinguished from bearings of the solid race type) to facilitate their removal, repair or replacement. Such apparatus is subject to certain undesirable features. Particularly it is not possible to replace bearings of the solid race type without dismantling the entire conveyor line. Also it is difficult if not impossible to remove one section by itself without disturbing the bearings and the other sections. In addition the couplings employed are generally weak and are subject to mechanical failure.

In general it is an object of the invention to provide apparatus of the above character having novel shaft coupling means.

Another object of the present invention is to provide screw conveyer apparatus that will permit the removal of solid race bearings without dismantling the entire conveyor line, and without lengthwise movement of screw sections.

Another object of the present invention is to provide improved conveyer apparatus of the screw type characterized by novel coupling means between the screw sections. In particular my coupling means permits the removal and replacement of one section without disturbing the bearings or the other sections.

Another object of the invention is to provide coupling means as described above which is not subject to mechanical failure and is relatively strong with respect to transmitting torque.

Additional objects and features of the invention will appear from the following description in which the preferred embodiment has been set forth in detail in conjunction with the accompanying drawings.

Referring to the drawing:

Figure 1 is a top plan view illustrating a conveyer construction in accordance with the present invention.

Figure 2 is a cross-sectional view, on an enlarged scale, taken along the line 2—2 of Figure 1.

Figure 3 is a cross sectional view, on an enlarged scale, taken along the line 3—3 of Figure 1.

Figure 4 is an exploded cross-sectional view in side elevation, illustrating various parts of the coupling, and taken along the line 4—4 of Figure 1.

Figure 5 is a side elevational view illustrating a further embodiment of the invention.

Figure 6 is a side elevational view illustrating a further embodiment of the invention.

The conveying apparatus illustrated in the drawing consists of a feed screw 10, formed of two or more rotatable sections 11. Each section consists of a tubular shaft 12, together with the helicoidal material-moving flight 13. Adjacent end portions of the two shafts 12 are secured together by coupling means designated generally at 14, each of which is associated with a bearing 16. Preferably the bearing is of the solid race type (e. g. with anti-frictional ball or roller races), as illustrated, and it is carried by a bracket 17 or other suitable support means. As previously explained it is customary to have the feed screw operating within a trough or housing (not shown) through which the material is being conveyed.

The end portions 12a of the screw sections are hollow and receive the solid coupling shaft 18. One side of each end portion 12a is cut away to provide a slot-like opening 21. The length of this slot-like opening is such as to clear the associated end portion of shaft 18. Each slot is defined by the side surfaces 22 that are spaced apart a distance equal to the diameter of the shaft bore. Also these defining surfaces preferably are substantially in planes parallel to each other and to the axis of the shaft, whereby they extend tangentially from the two sides of the bore in the manner illustrated in Figures 2 and 3. This construction provides side portions of substantial extent and strength for clamping with respect to the coupling shaft.

Preferably filler blocks 23 are positioned within the slots 21. The inner surface 24 of each filler block is curved to conform to the outer periphery of the coupling shaft 18. The side surfaces 26 of the filler block are in planes substantially parallel, and the dimensioning is such that these side surfaces are in close apposition to the surfaces 22 that define the sides of the slot. The wall thickness of each filler block 23 can be substantially the same as the remainder of the shaft 12. The length of each block is greater than the diameter of the coupling shaft.

Each filler block is clamped in place by suitable means such as a clamping bolt 27 (Figure 3), which extends through aligned holes provided in the shaft portion 12a, the coupling shaft 18, and the filler block. The coupling shaft is further clamped by the bolt 28 which extends through aligned openings in the side walls of the shaft portion 12a, as shown in Figure 2. It is desirable to locate the bolts 27 and 28 in the manner generally illustrated in Figure 1. Thus the cross-clamp bolts 28 are located closer to the ends of the shaft sections, than the bolts 27. Also the two sets of bolts in each instance extend approximately at right angles to each other.

When completely assembled in the manner illustrated in Figure 1, the ring bearing 16 engages a portion of the coupling shaft 18 between the adjacent ends of the shaft portions 12a.

Operation of my invention is as follows: Normally two or more of the sections are coupled together in the manner illustrated in Figure 1. When it is found desirable and necessary to remove a bearing, the operator loosens and removes the bolts 27 and 28 at each end of the section, together with the filler blocks 23. The bearing may now be bodily removed, together with the coupling shaft 18, and leaving the screw sections intact. A new or repaired bearing can be readily installed, together with its coupling shaft 18. After application of the filler blocks 23 and bolts 27 and 28, the assembly is ready for service. When it is desired to remove a screw section for replacement or repair, the bolts 27 and 28 at its ends are removed together with the associated filler blocks, and the section disengaged by lateral movement, without disturbing the adjacent screw sections or bearings.

It will be apparent from the foregoing that my invention greatly simplifies repair and maintenance of rotary conveyer screws and bearings, especially where a plurality of sections are employed with intervening couplings and support bearings of the solid ring type. A further feature of the invention is that it provides relatively high strength in transmitting torque from one section to another. In fact, the ability of the coupling to transmit torque is substantially equal to that of the hollow shaft sections. In this connection, note that the bolts 28 serve to hold together the adjacent side walls of the shaft ends, and clamp the same to the coupling shaft. The side walls are of substantial extent and strength, as previously mentioned, because the opening 21 is defined in accordance with the projected area of the coupling shaft. Also the end portions of the shaft sections are strengthened by the corresponding end portions of the helicoidal flights 13, since the end portions of the flights extend about the shaft end portions that are slotted. Thus when torque is being transmitted, there is no tendency for spreading to occur between the wall portions adjacent the slots, and in general the coupling transmits torque substantially the same as a rigid integral connection.

In some instances the coupling shaft may have a coupling connection of conventional construction to one screw section, and a connection made as described above to another section. Thus as shown in Figure 5 the coupling shaft 31 may have its one end fitted within the hollow shaft of screw section 32a, and secured by clamping bolts 33 and 34. The other end of the coupling shaft is connected to screw section 32b, by means such as previously described, thus permitting detachment and separation between section 32b and shaft 31 without relative movement in an axial direction.

As shown in Figure 6 the solid shaft 36, which may connect to driving means, is secured to the screw section 37 by use of my novel coupling means. Here again the construction permits detachment and separation between section 37 and the shaft 36 without relative movement in an axial section.

I claim:

1. In conveyor apparatus, conveyor means comprising a shaft and material-moving flight means mounted thereon, at least one end portion of said shaft being hollow, a shaft inserted within said hollow end portion, a slot formed in said hollow end portion, said slot extending in a direction axially of the hollow shaft portion for a substantial distance from the end thereof at least equal to the distance that the second named shaft is inserted in the hollow shaft portion, the surfaces defining said slot being spaced apart a distance only sufficient to allow for the passage of the inserted shaft end portion laterally therebetween, the two side wall portions of said hollow shaft portion adjacent the sides of the slot each extending for a substantial distance in a general direction tangential of the inserted shaft, a bolt passing through the two side walls of the hollow shaft portion and through the inserted shaft at its axis, and an additional bolt extending at right angles to the first mentioned bolt for securing the inner end portion of the inserted shaft to the hollow shaft portion.

2. Apparatus as in claim 1 together with a filler block disposed within said slot, said additional bolt serving to secure said block to the inserted and hollow shaft portions.

3. In conveyor apparatus, at least two rotatable aligned sections each comprising a shaft section and material-moving flight means mounted thereon, adjacent end portions of said shaft sections being hollow, a coupling shaft fitted within the adjacent hollow end portions of the shaft sections, each such hollow end portion having an open ended slot through one wall of the same that extends for a substantial distance from the end of the shaft section, each slot being of a width only sufficient to allow for the passage of the coupling shaft end portion laterally there between, clamping means for securing the side wall portions of each slotted end portion of the shaft sections to the coupling shaft, a filler block disposed within each slot, said clamping means each comprising a bolt for securing the inner end portion of the filler block to the coupling and hollow shaft portions, and an additional bolt passing through the two side walls of the hollow shaft portion and through the inserted shaft at its axis.

References Cited in the file of this patent

UNITED STATES PATENTS

| 1,016,748 | Howland | Feb. 6, 1912 |
| 1,158,844 | Price | Nov. 2, 1915 |
| 1,359,989 | Hiegel | Nov. 23, 1920 |